(12) United States Patent
Boccuzzi et al.

(10) Patent No.: US 11,862,200 B2
(45) Date of Patent: Jan. 2, 2024

(54) METHOD FOR THE CREATION OF INTERACTIVE AUDIO-VIDEO CONTENTS OF THE LIVE-ACTION TYPE FOR MOBILE TERMINALS, ELECTRONIC SYSTEM FOR THE IMPLEMENTATION OF THE METHOD, AND MOBILE TERMINAL FOR USING THE METHOD

(71) Applicant: HYPEX S.R.L., Monopoli (IT)

(72) Inventors: Riccardo Boccuzzi, Monopoli (IT);
Cosimo Michele De Russis,
Castelnuovo di Porto (IT)

(73) Assignee: HYPEX S.R.L., Monopoli (IT)

( * ) Notice: Subject to any disclaimer, the term of this patent is extended or adjusted under 35 U.S.C. 154(b) by 265 days.

(21) Appl. No.: 17/260,532

(22) PCT Filed: Jul. 18, 2019

(86) PCT No.: PCT/IB2019/056145
§ 371 (c)(1),
(2) Date: Jan. 14, 2021

(87) PCT Pub. No.: WO2020/016821
PCT Pub. Date: Jan. 23, 2020

(65) Prior Publication Data
US 2021/0264950 A1    Aug. 26, 2021

(30) Foreign Application Priority Data

Jul. 18, 2018    (IT) .......................... 102018000007298

(51) Int. Cl.
*G11B 27/034* (2006.01)
*G06F 3/04847* (2022.01)
(Continued)

(52) U.S. Cl.
CPC ........ *G11B 27/034* (2013.01); *G06F 3/04847* (2013.01); *G06F 3/04883* (2013.01); *G11B 27/105* (2013.01); *H04N 5/783* (2013.01)

(58) Field of Classification Search
None
See application file for complete search history.

(56) References Cited

U.S. PATENT DOCUMENTS 6,016,381 A       1/2000  Taira et al.
2008/0109727 A1*  5/2008  Colle ............... H04N 21/43072
                                                    719/328
(Continued)

FOREIGN PATENT DOCUMENTS

EP      0 737 980 A2    10/1996
WO      2004/074976 A2   9/2004
WO      2006/093426 A1   9/2006

*Primary Examiner* — Hung Q Dang
(74) *Attorney, Agent, or Firm* — Maschoff Brennan

(57) ABSTRACT

Methods for creating interactive audio-video contents, through visualization on an interactive display include providing a interconnected video segments, adapted to evolve in time, each having an initial video segment and one or more final video segments. Each video segment includes a non-interactive video clip having a given, or even null, duration, and an interactive node. The interactive node acts as an interconnection with one or more other video segments. Each interactive node includes a loop interval subject to continuous cyclical forward and backward time evolution. At least one set of commands determines connection choices among the video segments. The commands can be activated during at least one of the loop intervals. Upon activation of a command during the loop interval, the interval is exited and processing continues in the video segment of the one or more other video segments in which said interactive audio-video content continues.

15 Claims, 12 Drawing Sheets

(51) Int. Cl.
*G06F 3/04883* (2022.01)
*G11B 27/10* (2006.01)
*H04N 5/783* (2006.01)
*G11B 27/031* (2006.01)
*G11B 27/00* (2006.01)

(56) References Cited

U.S. PATENT DOCUMENTS

| | | |
|---|---|---|
| 2014/0010519 A1 | 1/2014 | Hayes |
| 2016/0034160 A1* | 2/2016 | Kaltner .............. G06F 3/04847 715/716 |
| 2016/0202861 A1* | 7/2016 | Weskamp .......... G06Q 30/0277 715/719 |
| 2017/0069351 A1* | 3/2017 | Weber ..................... H04N 5/84 |

* cited by examiner

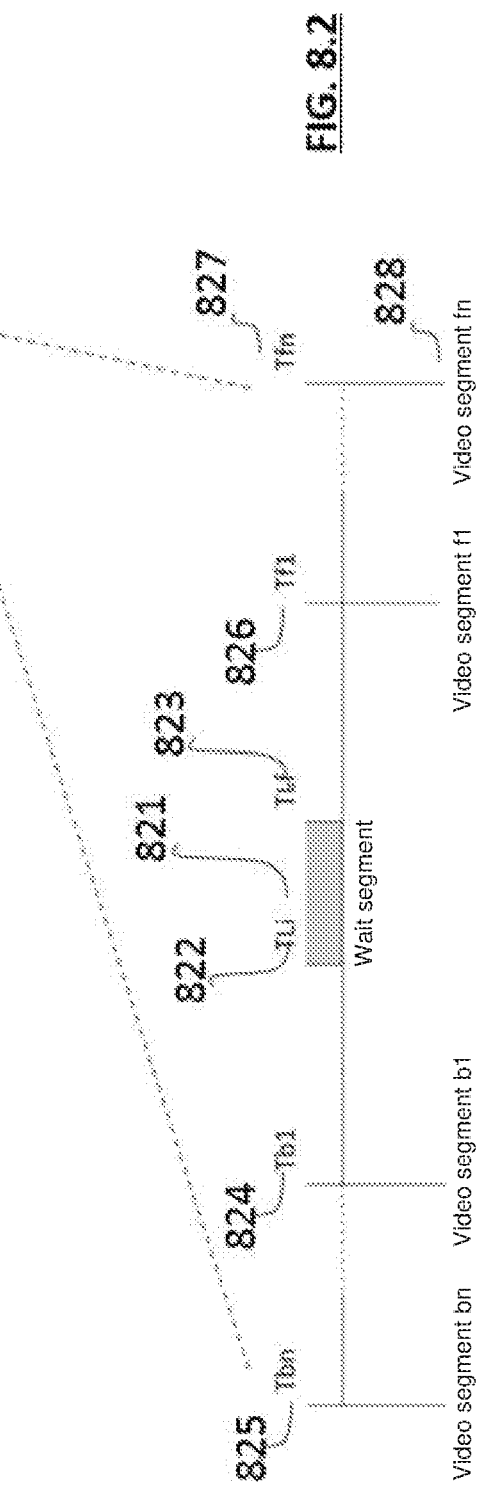

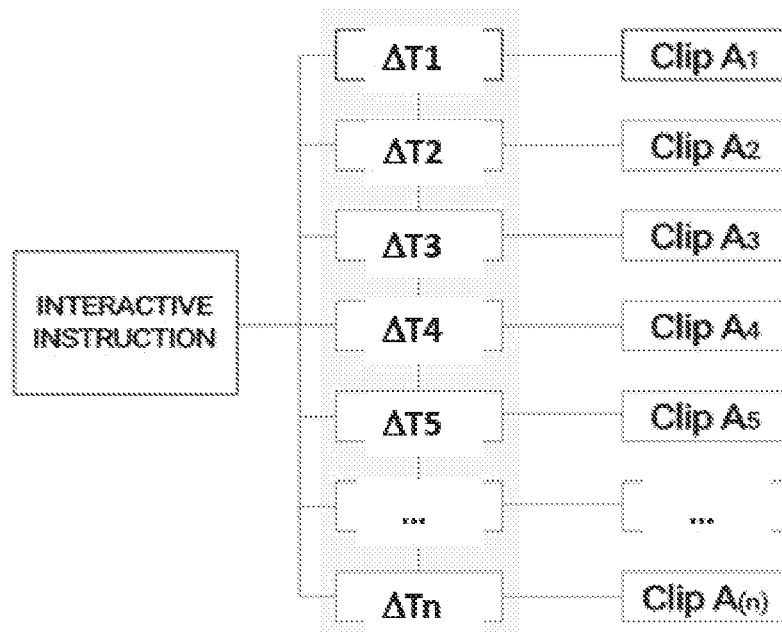
FIG. 9.1
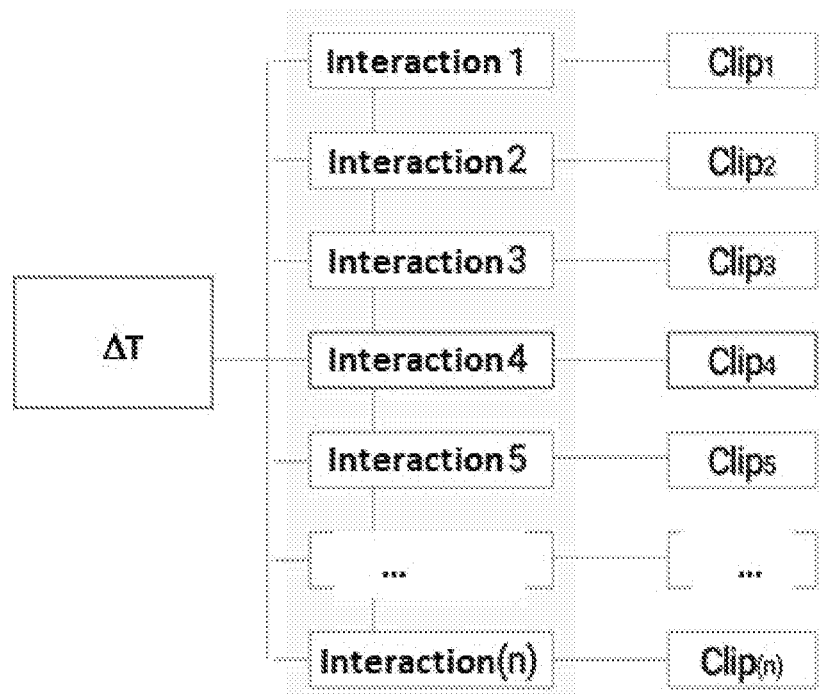
FIG. 9.2

FIG. 12.1
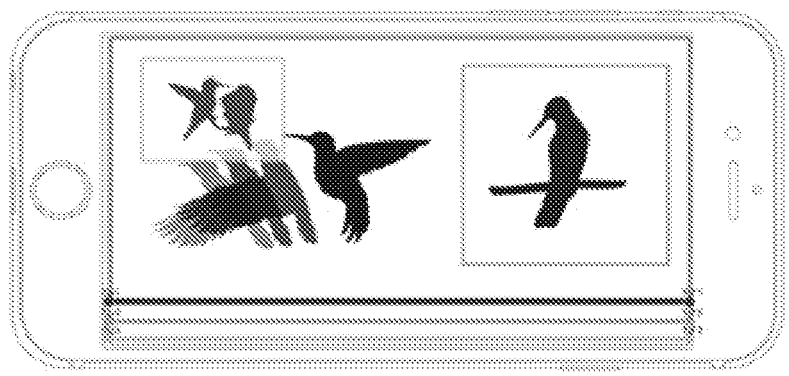
FIG. 12.2
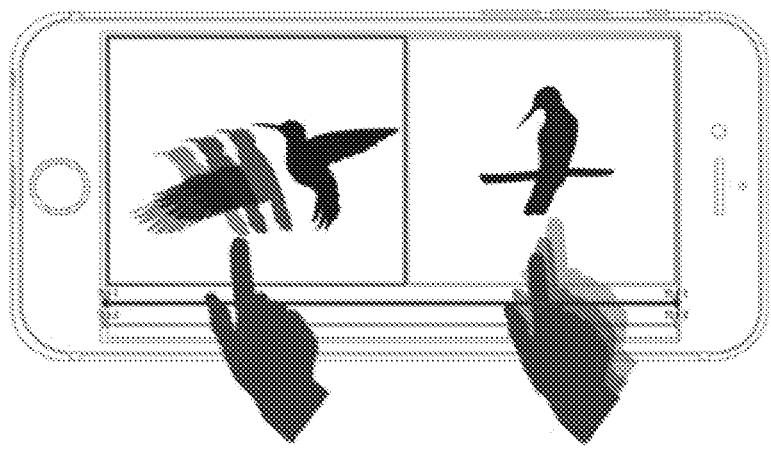
FIG. 12.3
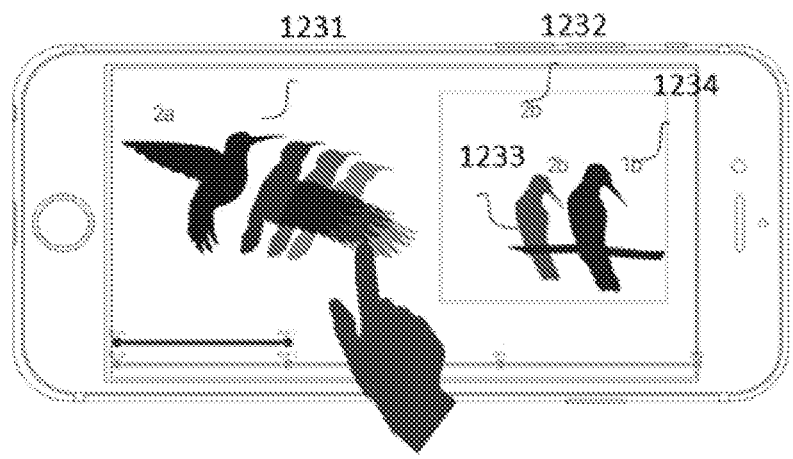

METHOD FOR THE CREATION OF INTERACTIVE AUDIO-VIDEO CONTENTS OF THE LIVE-ACTION TYPE FOR MOBILE TERMINALS, ELECTRONIC SYSTEM FOR THE IMPLEMENTATION OF THE METHOD, AND MOBILE TERMINAL FOR USING THE METHOD

FIELD OF APPLICATION OF THE INVENTION

The present invention relates to a method for the creation of interactive audio-video contents of the live-action type for mobile terminals, an electronic system for the implementation of the method, and a mobile terminal for using the method.

STATE OF THE ART

It is known that in the near future video contents will be enjoyed especially through mobile devices/terminals such as smartphones and tablet. Such devices, equipped with a plurality of sensors and actuators, can add to the audiovisual experience also the possibility of user/spectator interaction and content interaction, which is a fundamental element in processes for information acquisition/storage. For example, these may include applications for training or advertising purposes.

It is known that it is possible to create hypervideos, i.e. video streams containing anchors or links (also referred to as hyperlinks) clickable by the user, which allow navigation among videos and other hypermedia elements.

It is known that it is possible to modify the narrative development of a video by combining different video clips into a linear information structure, permitting choices based on the user's interests, which choices are made through elementary commands issued by pressing keys of remote controls or keyboards or by tapping directly on the display.

It is known that it is possible to add overlays or hyperlinks or hotspots to a video content through dedicated software (video editors) or through several online portals that permit the creation of interactive contents.

However, such portals or video editors are characterized by a practical limitation, since they only allow either adding digital contents (generally banners and/or links) to the video clip itself or switching between two narrative sequences by means of an elementary command: the "choice", i.e. pressing a key or tapping on the screen, thus leaving unsolved the technical problem of interactions only with the digital contents added to the video clip or simple interactions (taps) with the video clip itself.

In fact, the currently known possibility of interacting with a video clip exclusively through overlays/hyperlinks or through the elementary "choice" command does not allow the user to control the two fundamental and indispensable elements of the video clip itself, i.e. timeline and frame-rate, exploiting the whole plurality of sensors and actuators included in the mobile device.

It is known that it is possible to build audio/video contents in which the video clip succession is not predefined, but is composed—even in real time—upon request and/or upon a user's command, wherein, however, the switching from one clip to the next occurs through instantaneous, fixed cuts from the initial clip to the target clip, sometimes softened by fading or blending effects. In order to obtain different kinds of clip evolution, the user chooses one of several clips available, with a fixed, instantaneous transition between them. Therefore, the technical problem addressed by the present invention is to improve the interaction between user and system for the creation of audio-video contents, returning an interaction not characterized by sequence cuts, but soft, continuous and natural, through an interaction system that makes use of all sensors and actuators included in the mobile terminal and through intelligent timeline and frame-rate management.

It is known that in videogame applications it is possible to interact with the fundamental elements of a story (characters, environments, objects) or a narrative scenario (set of stories and their fundamental elements, i.e. characters, environments, objects). Such possibility is exploited also in the advertising and/or training fields to allow the users to interact with testimonials and/or products and/or services and/or information for the purpose of memorizing/learning/knowing qualities of testimonials and/or products and/or services and/or information. In the videogame field, however, the fundamental elements of a story (characters, environments, objects) or a narrative scenario (set of stories and their fundamental elements, i.e. characters, environments, objects) are the results of computer graphics processing (3D models) and, as photorealistic as they may be, cannot compare to the unquestionable realism of a video film (also known as live action).

Therefore, a further technical problem addressed by the present invention is to give the possibility of interacting with the fundamental elements of a story (characters, environments, objects) or a narrative scenario (set of stories and their fundamental elements) in the filming field without by any means manipulating the appearance of testimonials and/or products and/or services and/or information (as is the case in videogame applications), but through the unquestionable realism of a video film (also referred to as live action).

At the same time, another problem arises: computer graphics (3D models) is the result of a process that requires the modelling of planes/cubes/parallelepipeds/spheres/cylinders/cones/pyramids through 3D software. Therefore, proposing testimonials and/or products and/or services and/or information through computer graphics is an activity that requires specific skills and tools that are accessible to a small percentage of users only. On the contrary, creating a video clip is possible through devices of everyday use (smartphones, tablets, computers) accessible to a much greater, even massive, percentage of users. Therefore, a further technical problem addressed by the present invention is to allow a massive percentage of users (the so-called filmmakers) to create and propose interactive contents relating to their own testimonials and/or products and/or services and/or information without necessarily having to resort to specific computer graphics skills and tools, but simply through devices of everyday use smartphones, tablets, computers).

At the same time, a further problem arises: computer graphics (3D models) is the result of a process that requires a plurality of software packages and tools, the economical cost of which amounts to several thousands of Euros. Therefore, proposing interactive contents with testimonials and/or products and/or services and/or information through computer graphics is an activity that requires economic resources accessible to a small percentage of users only. On the contrary, creating a video clip is possible through devices of everyday use (smartphones, tablets, computers) that require no further costs in addition to the cost of the device of everyday use (already purchased) and that are accessible to a much greater, even massive, percentage of users.

Therefore, a further technical problem addressed by the present invention is to allow a massive percentage of users (the so-called film-makers) to propose interactive contents relating to their own testimonials and/or products and/or services and/or information without necessarily having to incur any further costs in addition to the purchase of their own device of everyday use, as opposed to having to resort to a plurality of software applications and tools necessary for computer graphics.

SUMMARY OF THE INVENTION

It is therefore the object of the present invention to propose a method for the creation of interactive audio-video contents of the live-action type for mobile terminals, an electronic system for the implementation of the method, and a mobile terminal for using the method, which intend to overcome all of the above-mentioned problems.

It has been verified that no video editor currently exists which is capable of associating "gestures" from a touch-screen and/or from sensors (e.g. gyroscopes, microphones, cameras, etc.) of smartphones and tablets with video clip-related commands/controls, thus making a live-action video interactive.

According to the present invention, video clip-related interactions refer to controls and commands that allow manipulating/modulating the timeline and/or compositing levels of a video clip. This means, therefore, the possibility of controlling the video timeline or frame-rate to control the direction in time (forwards and/or backwards) or the speed (to increase and/or reduce the speed) of the video clip; in fact, while overlays and hyperlinks are, de facto, a supplementary (additional) element added to the video clip (a video clip may have no overlays or hyperlinks, since overlays and hyperlinks are not essential elements for the fruition of a video clip), a video clip must necessarily have a timeline and a frame-rate (which are, therefore, essential elements for the fruition of a video clip).

It is therefore one object of the invention to provide a system for the creation of interactive audio-video contents of the live-action type for controllable/manoeuvrable mobile terminals, as a sequence of video clips, through the use of a plurality of sensors, actuators and commands for managing, controlling and manipulating a frame in the video clip, which affect the timeline (time) and the frame-rate (speed) of the video clip.

The present invention relates to a method for the creation of interactive audio-video contents of the live-action type in a mobile user terminal, said contents being adapted to be controlled and manoeuvred by the user through visualization on an interactive display of said mobile terminal, comprising the following steps:
  providing at least one set of interconnected video segments in said mobile terminal, adapted to evolve in time, starting from an initial video segment, through one or more selectable intermediate video segments, up to one or more selectable final video segments, each video segment comprising a non-interactive video clip having a given, or even null, duration, and an interactive node, said interactive node acting as an interconnection with one or more other video segments of said set, each interactive node comprising a loop interval subject to automatic cyclical forward and backward time evolution, when selected,
  providing at least one set of commands in said mobile terminal, adapted to determine said connection selections among said video segments, wherein said commands can be activated during at least one of said loop intervals, in at least one of said loop intervals, association between said commands and video segments of said one or more other video segments,
  upon activation of a command during said loop interval, exiting said interval in a fluid and soft manner towards another video segment selected among said one or more other video segments in which said interactive audio-video content continues, depending on the command issued among said set of commands, starting from said initial video segment and ending in one of said final video segments, so as to create said interactive audio-video content on said interactive display as a sequence of said video segments not known a priori, i.e. a filmic narration which is fluid and continuous, modified and controlled in real time by the user/spectator, without image jumps when switching between successive video segments in said nodes.

Said commands in the mobile terminal are derived from corresponding commands:
  issued through a plurality of sensors included in the user terminal;
  issued through software commands in the terminal; or
  issued through any combination of the above.

It is another object of the present invention to provide a method of association between commands of evolution in time of an interactive audio-video content of the live-action type and video segments composing said interactive audio-video content in a mobile terminal, comprising providing in said mobile terminal one or more loop intervals subject to automatic cyclic forward and backward time evolution in said video segments, and executing at least one of said commands in said mobile terminal during said one or more loop intervals to determine said evolution in time of the interactive audio-video content as a path among said video segments.

The present invention further relates to a system and a user terminal for implementing the method.

It is a particular object of the present invention to provide a method for the creation of interactive audio-video contents of the live-action type for mobile terminals, an electronic system for the implementation of the method, and a mobile terminal for using the method, as set out in the claims, which are an integral part of the present description.

BRIEF DESCRIPTION OF THE DRAWINGS

Further objects and advantages of the present invention will become apparent from the following detailed description of a preferred embodiment (and variants) thereof referring to the annexed drawings, which are only supplied by way of non-limiting example, wherein:

FIGS. 2, 5, 8.1, 8.2, 9.1, 9.2 show some details of the structure of FIG. 1;

FIGS. 4, 10, 11, 12.1, 12.2, 12.3 show some examples of commands applied to loop sections of the video segments for building the interactive audio-video contents;

In the drawings, the same reference numerals and letters identify the same items or components.

DETAILED DESCRIPTION OF SOME EMBODIMENTS

As aforesaid, it is one object of the invention to provide a method for the creation of controllable/manoeuvrable interactive audio-video contents of the live-action type for mobile user terminals, as a sequence of video clips, through the use of a plurality of sensors and commands for managing, controlling and manipulating a frame in the video clip, which affect the timeline (time evolution) and the frame-rate (speed) of the video clip. In the present context, the interactive audio-video contents of the "live-action" type are meant to be "live-action" or "real-action" contents, i.e. films played by "real" actors, as opposed to films created through animation (drawing, computer graphics, stop-motion, etc.)

Thanks to the invention described herein, it is possible to enjoy "live-action" video narration that can instantly show, without solution of continuity, the results of the video-clip composition actions with no pauses, loadings or interruptions, as a sequence of video segments not known a priori, i.e. a fluid and continuous filmic narration, modified and controlled in real time by the user/spectator, with no image jumps when switching between successive video segments in the nodes, as will be described hereinafter.

The basic idea of the invention is, therefore, to provide a method for the creation of controllable/manoeuvrable interactive audio-video contents of the live-action type and a video editor that allows creating independent audio-video contents encapsulated into suitable APPs or readable by a video player capable of recognizing and appropriately reacting to the controls and commands issued by the user through the use of any mode of interaction available in his/her mobile terminal, modifying in real time the succession of the video segments and hence the contents of the filmic narration.

MANOEUVRABLE INTERACTIVE VIDEO refers to a filmic narration wherein the time succession of the scenes (also called montage or direction) is not defined a priori by the author of the video, but is built in real time as a function of the interactions and selections INTERACTION COMMANDS made by the spectator (or user) during fruition.

The MANOEUVRABLE INTERACTIVE VIDEO (FIG. 1) is composed of a set of video narrations or VIDEO SEGMENTS 101.

VIDEO SEGMENTS are joined together at narrative points called NODES 103.

Figure 5:
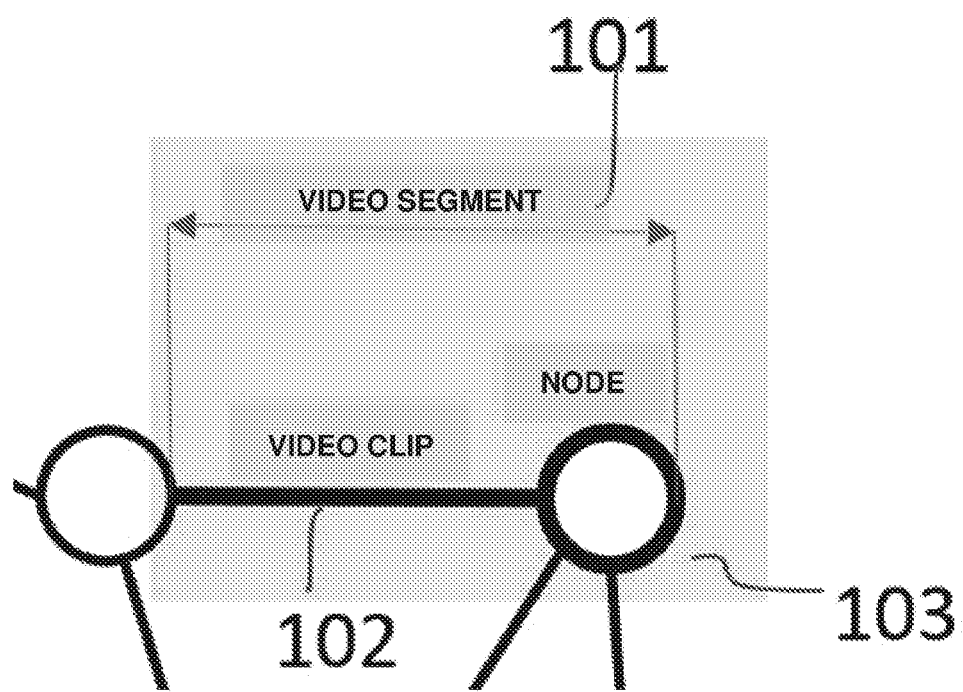

A VIDEO CLIP (FIG. 5) is the NON-INTERACTIVE OR NON INTEROPERABLE or NON-MANOEUVRABLE filmic narrative element of a MANOEUVRABLE INTERACTIVE VIDEO 102.

A NODE 103 is the point of interconnection among different VIDEO SEGMENTS.

The NODE is also the INTERACTIVE OR INTEROPERABLE or MANOEUVRABLE filmic narrative element of a MANOEUVRABLE INTERACTIVE VIDEO.

A VIDEO CLIP is the time-successive aggregation of video takes or contents, called SEQUENCES—see FIG. 8.1:

Video clip=Sequence$_1$+Sequence$_2$+Sequence$_3$+ ... +Sequencer$_{a-1}$+Sequence$_n$ At the end of each video clip there is a node sequence or Sequence$_n$ or NODE.

A node sequence is a filmic take characterized by a series of [time markers], defined as follows:—see FIG. 8.2.

TLi. Loop start time
TLf Loop end time
Tf1 ... Tfn Forward time 1 ... Forward time n
Tb1 ... Tbn Backward time 1 ... Backward time n Wait interval or LOOP 821 refers to the narration between the markers TLf 822 and TLi 823.

The markers Tfi 826,827 and Tbi 824,825 are referred to as exit points.

Figure 1:
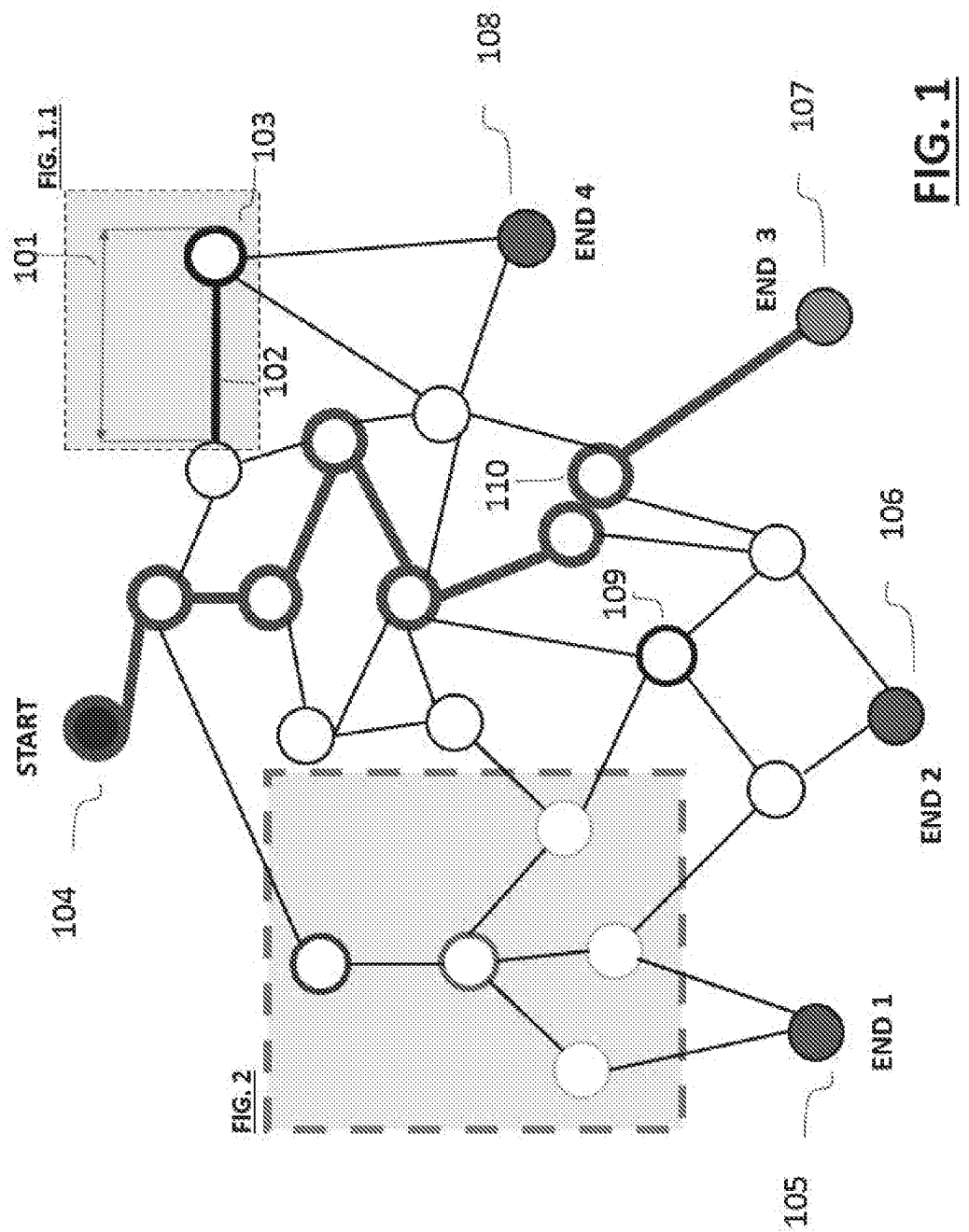
FIG. 1 shows an example of a video-clip assembly structure for the creation of interactive audio-video contents of the live-action type for mobile terminals according to the present invention.

To each exit point, the start 828 of a VIDEO SEGMENT is connected, see FIG. 1.

A node sequence may be the termination of several VIDEO SEGMENTS 109.

From one node sequence, several VIDEO SEGMENTS 109 may start.

The node sequences without exit points are called narration endings 105-108.

Given the above definitions, it is assumed that it is per se known how each video clip can be created, which is made up of a sequence of known video and audio frames in a per se known digital format, e.g. 2D or 3D.

With reference to FIG. 1, in a per se known manner a MULTISTORY is predetermined, i.e. a database of video segments and the multipath network of interconnections among them (or quest tree), which may allow the composition of an interactive audio-video content, consisting of one of the possible clip sequences made possible by the clip interconnections in the multipath network, starting from the start instant of a first clip START 104 up to the end instant of one of the N possible final clips (narration endings), referred to in the figure as END1, ... ENDn 105-108.

The lines in the network symbolize the evolution in time of each clip, while the nodes symbolyze the transitions from one clip to another. Several video clips may meet at one node and/or several lines may start from one node, meaning that it is possible to switch from one clip to one or more other clips according to the specific mode of the invention described below.

Figure 2:
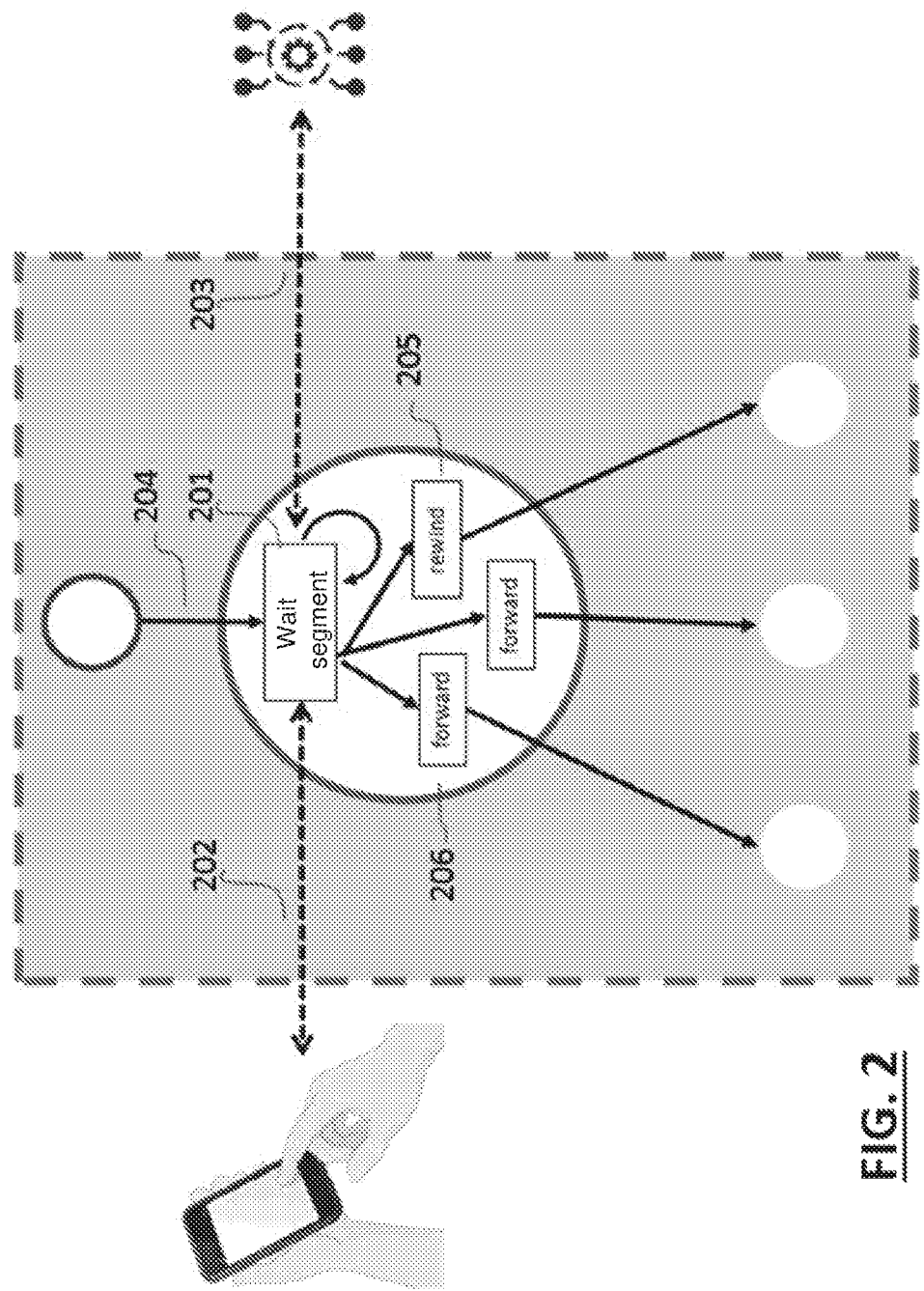

Entry into the node or into the node sequence occurs at the instant TLi 822, i.e. the start point of the wait interval, in which the evolution of the clip occurs automatically, cyclically and continuously forwards and backwards (rewind) between TLI (822) and TLf (823), see FIG. 2.

Within this automatic cyclic evolution (from instant TLi to instant TLf), the system is in Loop (201), waiting to receive a command for evolving towards another clip, through any one of the commands of interaction between the mobile terminal and the user, which command may arrive at any instant within the loop, according to the decision of the user, who chooses the instant for exiting the loop, thus obtaining a soft transition from one clip to the next one.

Optionally, the system may evolve automatically towards another clip, if no commands are received from the user within a MAXIMUM TIME.

Optionally, the wait interval of a node sequence can be reproduced only once (no loop). This permits the creation of situations where, if the user interacts with the correct "interactive instruction" within the wait interval, then the narration will continue following the main narrative flow; otherwise, i.e. if no command or a wrong command is issued, different video segments will be linked.

Optionally, the system may automatically handle the timeline and frame-rate of the loop (e.g. for slowing down the scene, ... ) while waiting for a command from the user.

The types of available commands 202 are many and can be issued through specific user actions, such as the following:

a plurality of sensors, such as touch-pad, microphone, gyroscope, camera, ...

a plurality of gestures, such as swipe, pinch, . . .
a plurality of combinations of the above sensors and gestures, . . .
or issued through [software commands] 203, e.g. generated by timers (e.g. maximum time of permanence of the wait interval) or as a consequence of other commands generated by the user e.g. parallel multistories, wherein a user command issued for a first multistory also results in a software command affecting the second multistory).

These commands are already known and available, for example, in some types of mobile telephone terminals, such as smartphones, being transformed in a known manner into electric and/or electronic control signals in the terminal.

The user terminal comprises an interactive display and/or one or more sensors, from which at least some of said commands can be derived, and/or one or more motion or voice or image or position detectors, from which at least some of said commands can be derived. Based on the specific command received, issued within the wait interval, the system determines how the transition from one clip to another clip should evolve.

This means that, based on the type of command received in the loop (e.g. fast or slow shaking of the motion sensor), the time evolution of the node sequence will be modified by managing the flow speed and direction and the point where a jump to the next clip should occur within the node sequence.

Figure 3:
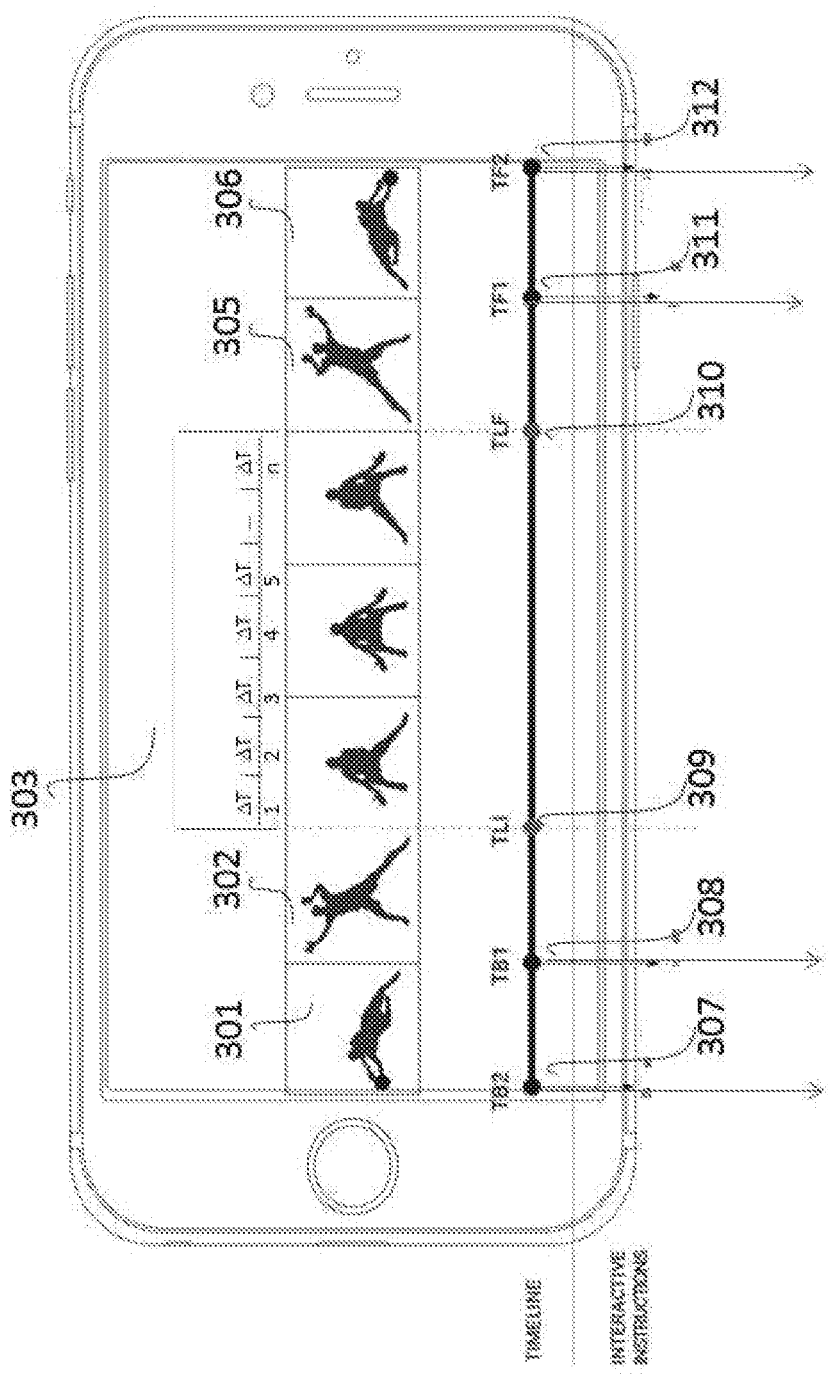
FIG. 3 shows an example of the structure of a video segment according to the present invention, with visualization on a display.

Therefore, based on the type of command issued, the system will decide how the node sequence should evolve (forwards, back-wards, fast, slow, . . . ) and hence also the point of the node sequence (301, 302, 305, 306) from which to go towards another clip, see FIG. 3 (interactive instruction).

For every single node within the system, a matching table is defined between command types and evolution types.

There is a user interface that senses the command issued by the user and associates it with the type of reaction affecting the evolution of the clip.

The available commands may depend on the node, and may therefore be different for each node sequence.

Some node sequences may not be associated with any commands, and therefore may not contain a narration endings loop 105-108.

Some node sequences may consist of the loop only, so that it will be possible to jump from a loop directly to a subsequent segment or loop 110.

With reference to FIG. 2, the evolution of the VIDEO CLIP 204 ends into a WAIT INTERVAL or LOOP 201. Based on the command COMM received 202,203, the table of possible command/transition combinations will determine the exit time marker and the next video segment.

If the exit time marker is placed before the start of the loop, then the system will move backwards, by appropriately adjusting the timeline and frame-rate, up to the exit point, thus linking to the next video segment 205.

If the exit time marker is placed after the end of the loop, then the system will move forwards, by appropriately adjusting the timeline and frame-rate, up to the exit point, thus linking to the next video segment 206.

For example, if during the wait interval (loop) a swipe right command 402 is issued (FIG. 4), then the node sequence will be executed in forward mode past the TLF marker (310) up to TF1 (311); if a two swipe right command 404 is issued, then the clip will go forwards past the marker TF1 311, up to the marker TF (312), displaying the associated video segment.

If during the wait interval (loop) a swipe left command 401 is issued (FIG. 4), then the node sequence will be executed in backward mode past the TLI marker (309) up to TB1 (308); if a two swipe left command 403 is issued, then the clip will go backwards past the marker TB1 308, up to the marker TB2 (307), displaying the associated video segment. INTERACTION COMMANDS can only be issued, and hence interpreted, during the execution of the [Wait interval].

Management commands are, on the contrary, commands not related to interaction, and can be issued at any instant during multistory fruition or development, e.g. in order to impose a rewind action following a wrong or unpleasant selection or to jump to a previous clip.

According to a further variant, the same command issued at different time instants within the wait interval may execute the exit from the node sequence in different ways.

The wait segment is divided into n time intervals ΔT (304) and associated with an interactive instruction. One Clip(n) will be associated with each ΔT—see FIG. 9.1. According to a further variant, it is possible to assign different commands to the same time interval ΔT within the wait interval in order to develop the node sequence in different ways.

In a given time interval ΔT, a defined Clip(n) corresponds to each interactive instruction, see FIG. 9.2.

According to a further variant, if the wait interval of a node sequence is a video taken at a frame-rate higher than 24 fps (e.g. 300 fps), the commands of the interactive instruction may increase or decrease the frame-rate of the node sequence.

Figure 10:
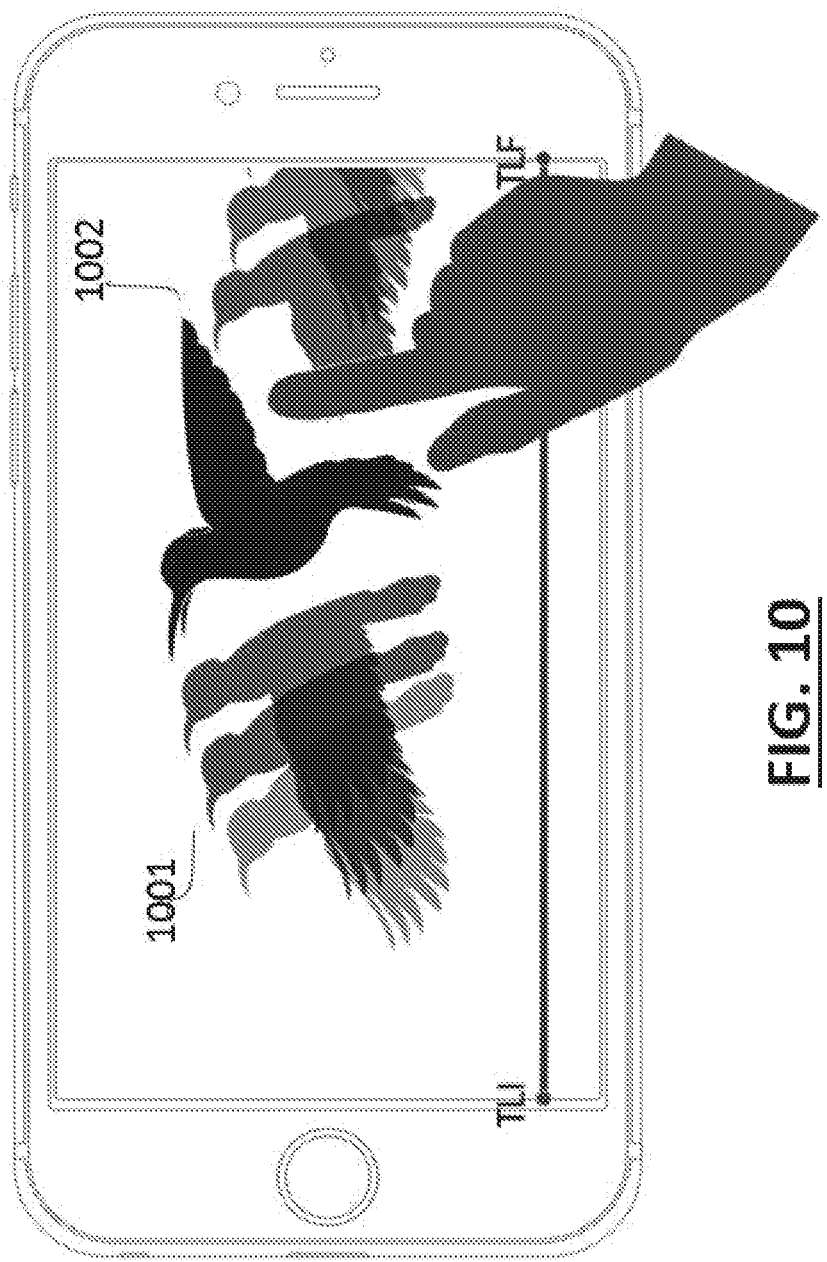

For example (see FIG. 10), upon the given interactive instruction (e.g. tap) any point within the wait interval, the frame-rate decreases (slows down) to allow for better observation of the flight of the humming bird (1001) or, vice versa, the frame-rate increases (accelerates) to allow observing the humming bird in action (1002).

Figure 11:
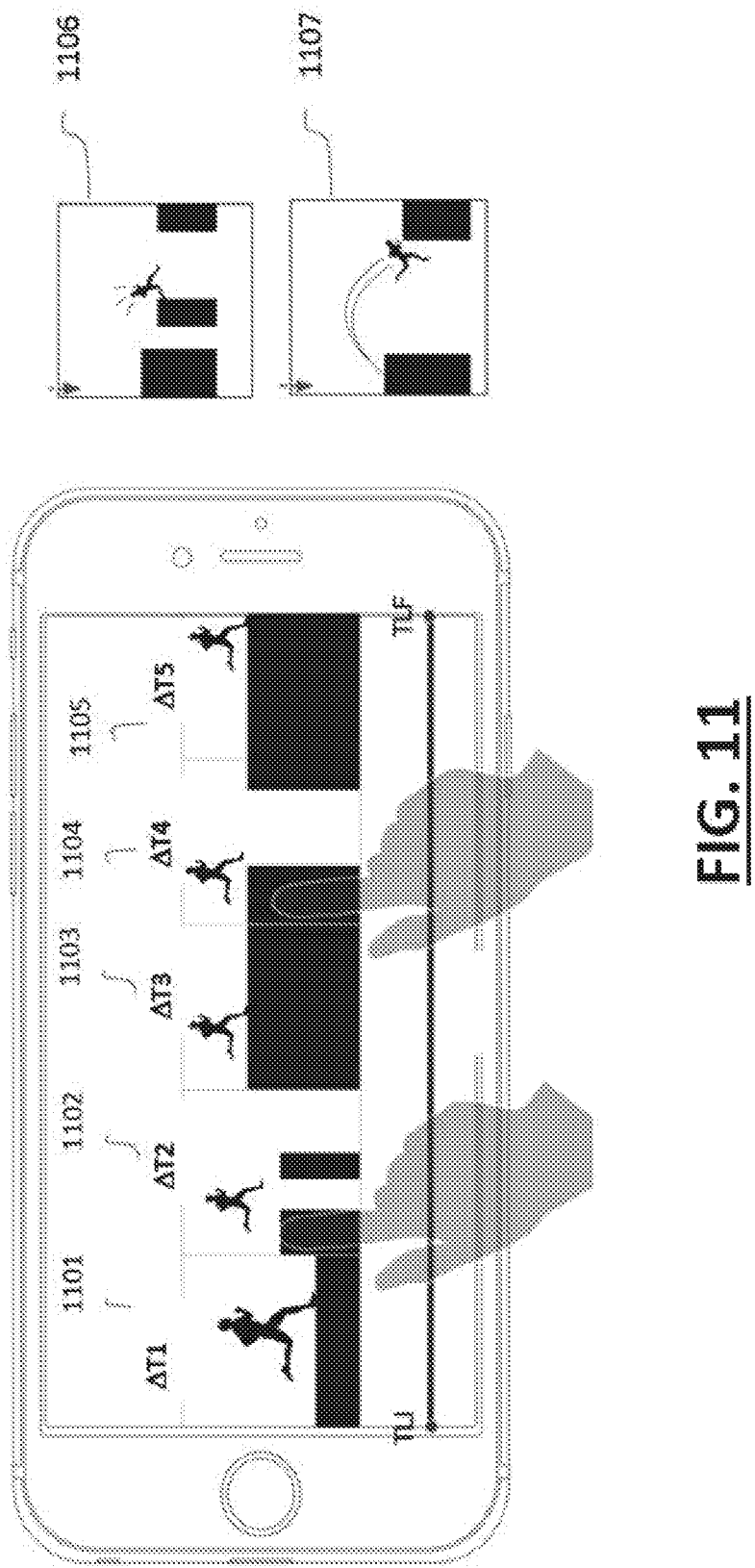

For example (see FIG. 11), in the node sequence with a wait interval, upon the given interactive instruction (e.g. tap), in a given time interval, the frame-rate decreases (slows down) to allow increasing the precision of the jump and prevent falling (1102); in fact, should the given interactive instruction be executed in a wrong manner or out of sync, then the player will not land precisely on the nearest bank, thus falling into the void (1106).

As an alternative to the given interactive instruction (e.g. tap), in a given time interval the frame-rate increases (accelerates) to allow increasing the elevation of the jump to reach the opposite bank (1104); should the given interactive instruction be executed in a wrong manner or out of sync, the player will not take sufficient run-up and will fall into the void, thus not reaching the opposite bank (1107).

Within the same wait segment there may be several interactive instructions, in different time intervals (1101-1105).

According to a further variant, based on further types of commands (interaction and management commands) received, simultaneous side-by-side visualization of two or more MULTISTORIES is obtained, each one possibly having a timeline of its own subject to different commands, at different times.

With reference to FIG. 12.1, two or more node sequences can be executed on the same display, whether in different layouts or superimposed. The interactive instructions assigned to combined node sequences may be:
a) mutually independent
b) mutually interactive In case of simultaneous vision of multiple multistories, a user command issued on one multistory may be associated with software commands capable of causing the parallel evolution of one or more node sequences of other multistories.

Example of combined node sequences with independent interactive instructions: with reference to FIG. 12.2, according to the timeline highlighted in red the humming bird can go into slow motion upon the assigned interactive instruction (e.g. tap); according to the timeline highlighted in green, the humming bird can fly off upon the assigned interactive instruction (e.g. swipe up). The two node sequences corribined together do not affect the respective timelines, framerates or interactive instructions by any means.

The combined node sequences can be manoeuvred either simultaneously (at the same instant) or separately (at di stinc instants); they will need different interactive instructions in the former case or, in the latter case, indifferent ones.

Example of combined node sequences with complementary interactive instructions: with reference to FIG. 12.3, according to the timeline highlighted in red the humming bird 1231 can go into slow motion upon the assigned interactive instruction (e.g. tap); at the same time, the timeline highlighted in green waits in Loop for the sequence highlighted in red to respond to the interactive instruction; once the interactive instruction of the sequence highlighted in red has been executed, the green sequence will execute the clip past the marker (in the drawing, the humming bird 1233 can reach the humming bird 1234, if the humming bird 1231 makes a precise landing). The two node sequences combined together affect the respective timelines, framerates or interactive instructions, because the evolution of one of them implies a different evolution of the other.

Figure 4:
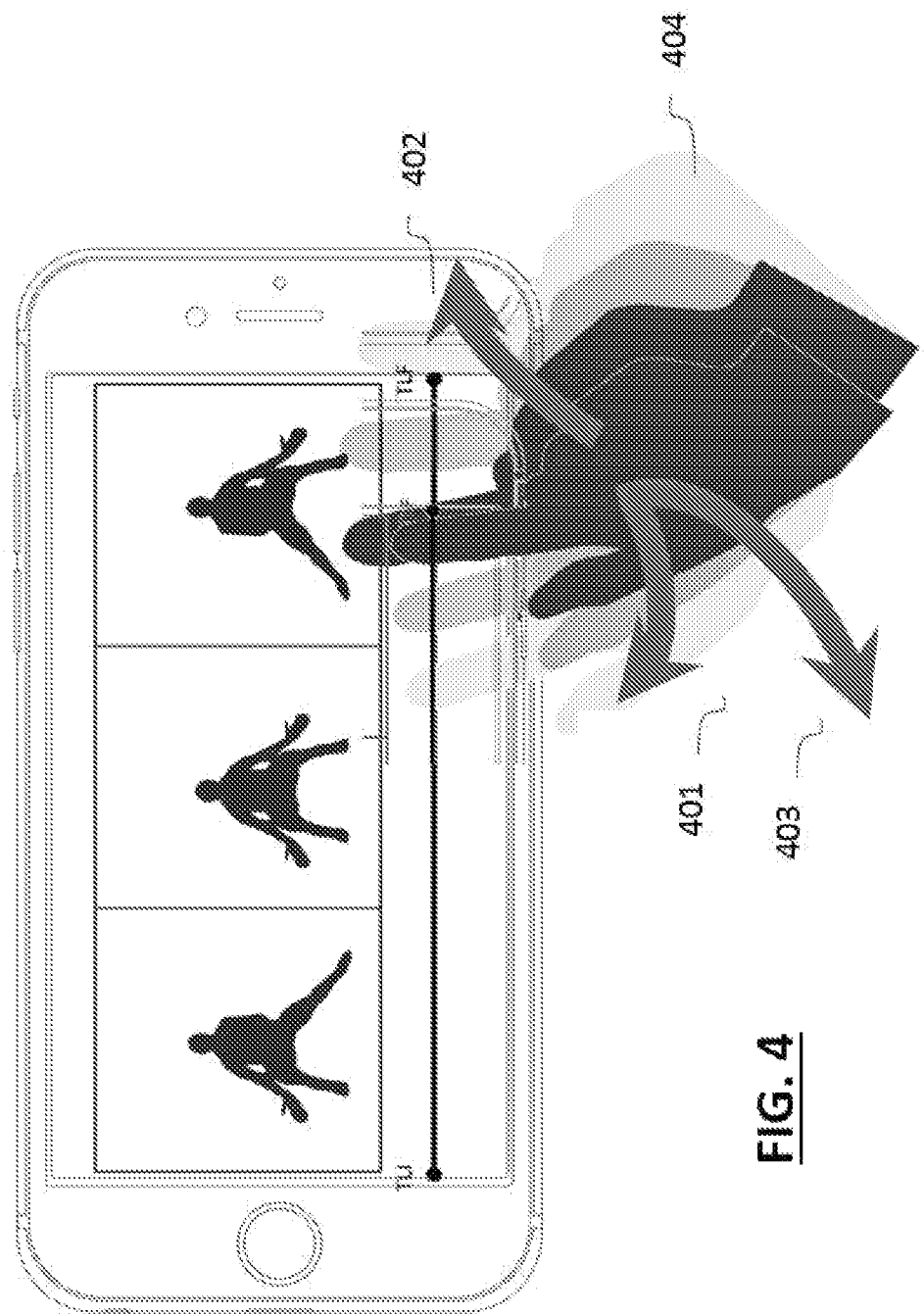
Figure 6:
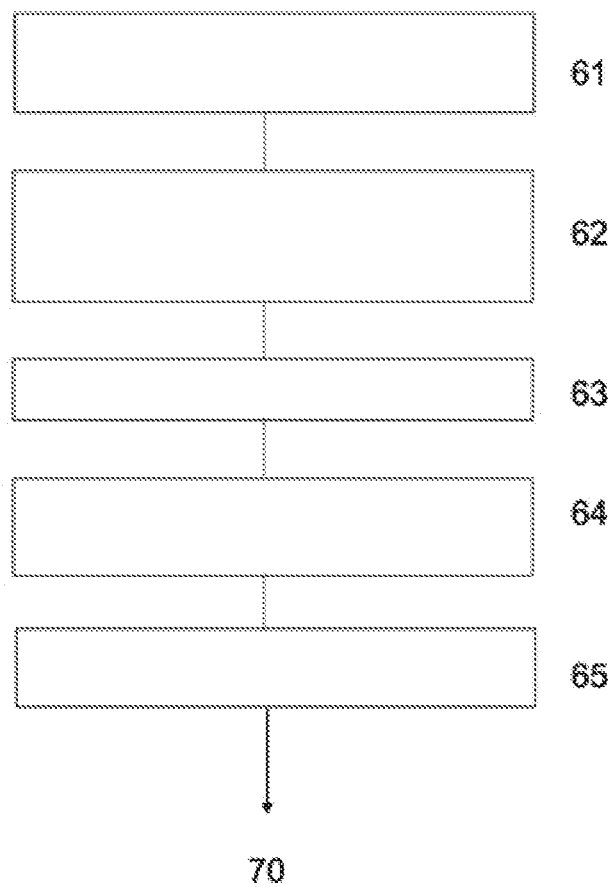
FIGS. 6, 7 are flow charts of the control software structure of the method of the present invention.
Figure 7:
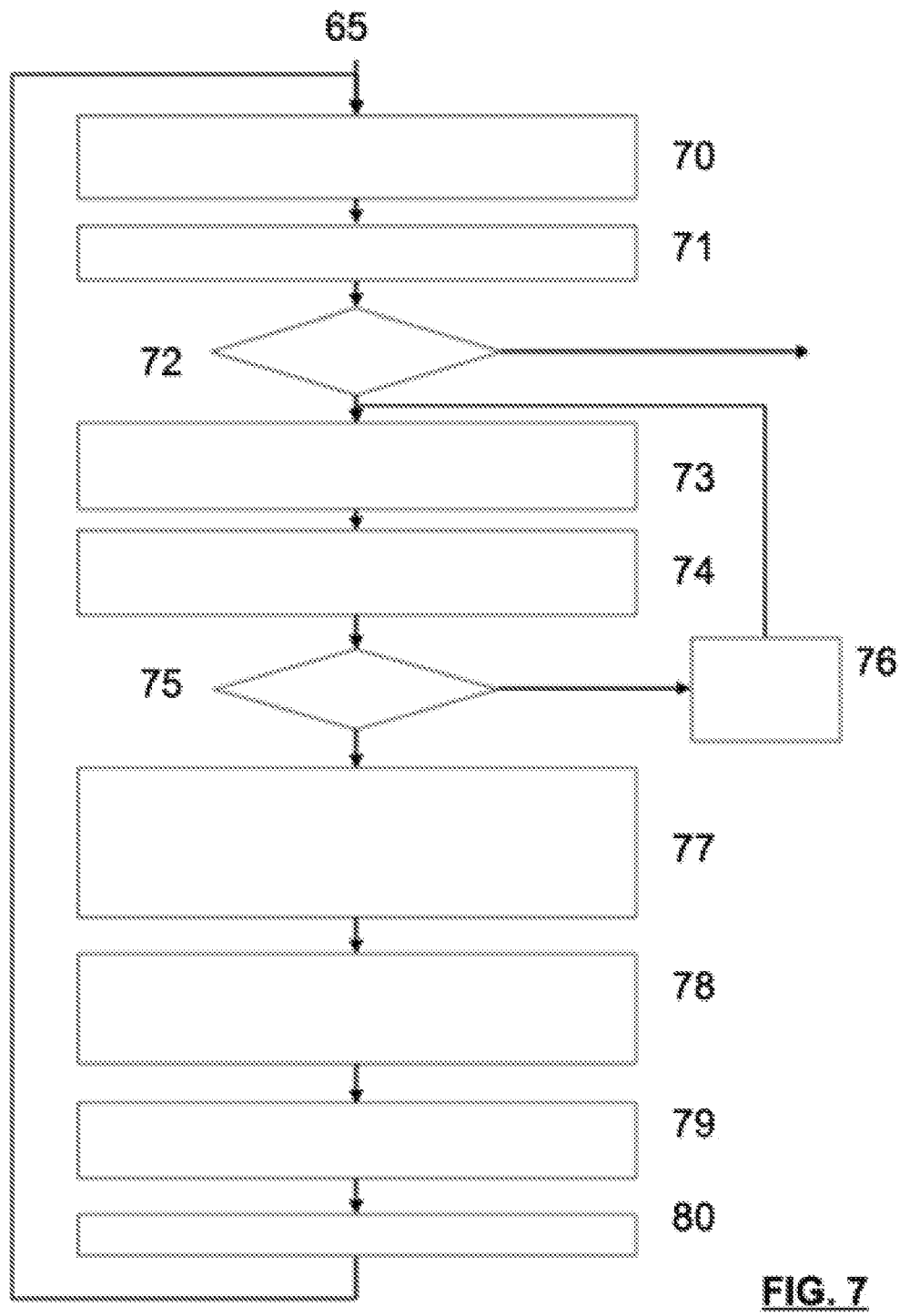

The following will explain in more detail the operating sequence of the system/method with reference to FIGS. 6 and 7, which show the operating flow charts, FIGS. 8.1 and 8.2, which show the composition of a video clip, and FIGS. 3 and 4, which show some examples of interaction with a user terminal.

With reference to the flow chart of FIG. 6:

From a given App Store (e.g.: Apple Store or Google Play), the user downloads an .IPA file (or a file in an equivalent format) to his/her own device (smartphone or tablet) (block 61).

The .IPA file (or file in an equivalent format) downloads to the memory of the device a library of [VIDEO CLIPS] and layouts/templates coded in computer languages (e.g.: C++) compatible with iOS, Android and other operating systems (block 62).

By clicking on the icon of the .IPA file (or file in an equivalent format), the Application is executed (block 63).

The initial interface is the menu of the Application, which includes, among others, the "START" button (or equivalent commands, e.g.: BEGIN, START, etc.) (block 64 and FIG. 9.1).

The video player displays the first [VIDEO CLIP] or [INITIAL CLIP] (block 65 and FIG. 9.2).

The flow continues from FIG. 6 to FIG. 7.

With reference to the flow chart of FIG. 7 and to FIGS. 8.1, 8.2:

The software by means of computer code (e.g.: C++) compatible with the operating system of the device (smartphone or tablet) executes the assigned VIDEO SEGMENT, linking in succession the SEQUENCES of the VIDEO CLIP (block 70).

The last sequence Sequence, or Node Sequence is connected to Sequence$_{n-1}$ at the instant TLi (block 71), i.e. the frame of the Node Sequence identified by the time marker TLi will be linked—in succession—to the last frame of Sequence$_{n-1}$.

If the Node Sequence is a final sequence or [Narration ending], the procedure will end (END) (block 72), otherwise it will continue.

If the procedure goes on, the video clip will move forwards and backwards in the time segment between the markers TLi and TLf [Wait interval], waiting for a command action from the user (block 73 and 303).

The software by means of computer code (e.g.: C++) compatible with the operating system of the device (smartphone or tablet) may also appropriately adjust the running speed of the [Wait interval], slowing down or accelerating the frame-rate in order to give more realism to the wait situation (block 74).

When the reception of a [command] is verified (block 75), the software by means of computer code (e.g.: C++) compatible with the operating system of the device (smartphone or tablet) associates a given gesture of the touchscreen (e.g.: swipe, tap, rotate, etc.) or a given input of the sensors of the device (e.g.: gyroscope, volume, etc.) or a given software command with a given time direction (backwards or forwards relative to TLi or TLf) and/or with a given frame-rate of the video clip (acceleration or slowing down) and/or with a given combination of both factors (time direction+frame-rate (block 77, FIG. 4).

If absence of interactions is verified (block 75), then the loop between TLi and TLf will continue (block 76), and the operations will return to block 73 (303).

In the presence of a command from the user or from the software, the procedure will exit the loop of the wait interval, moving forwards or backwards to the time marker Exit point connected to that user action or command (block 78, 307-308, 311-312).

When the Exit point is arrived at, the software selects from the library (see point 2) the new VIDEO SEGMENT associated with the type of selection and/or command just executed (block 79).

The video player displays the new VIDEO CLIP (block 80).

The process starts again from the beginning (block 70).

The result is a succession of VIDEO SEGMENTS, the evolution of which—MANOEUVRED by the user's actions—produces a narrative experience—characterized by the choices of the user him/herself—that is unique, original and involving as a whole. The present invention can advantageously be implemented through a computer program VIDEO EDITOR, which comprises coding means for implementing one or more steps of the method when said program is executed by a computer.

The following will list the steps of the process of using the method through the VIDEO EDITOR:

a) Given a library of (n), composed of all video sequences (including, therefore, all possible branches of the Multistory), the computer expert [OPERATOR] selects the sequences for composing the [VIDEO SEGMENTS], including the sequences transformed into node sequences.

b) On the timeline of the node segment, the computer expert sets two time markers that delimit the backward and forward loop Wait interval of the node sequence. In this way, the node sequence will only be executed in backward and forward loop within the two time markers set on the timeline.

c) On the timeline within the Wait interval, the computer expert may set other additional time markers, as a function of the interaction gestures expected by the narrative development of the Multistory.
d) On the timeline of a video segment, the computer expert also sets any [exit time markers] and connection markers towards the next video segments, in accordance with the narrative construction of the Multistory.
e) The computer expert selects a given command readable by the mobile device (smartphone and/or tablet) relating to gestures and sensors of the device capable of sending executable inputs (e.g.: gesture on the touchscreen, voice command through the microphone, rotation of the gyroscope, etc.).
f) At each time marker set within the wait interval, the computer expert associates the previously selected command, so that upon that given command the node sequence will be executed past the markers delimiting the wait interval [TLi, TLf], up to the time markers connected with the associated command.
g) The computer expert selects from the library the video segments that will follow the executed node sequence based on the associated command; in this way, a given video segment(n) will correspond to the given command associated with the time marker and to the relevant "unlocked" part of the node sequence.
h) The computer expert repeats the same process using all the n sequences in the library, alternating video clips and node sequences so as to create the plurality of possible narrative directions of the Multistory [or "quest tree"].
i) Once the quest tree has been formed and closed, the expert exports the project as an .IPA or equivalent file readable by the App Stores (e.g.: Apple Store, Google Play, etc.).

It is therefore understood that the protection scope extends to said computer program VIDEO EDITOR as well as to computer-readable means that comprise a recorded message, said computer-readable means comprising program coding means for implementing one or more steps of the method when said program is executed by a computer.

The above-described non-limiting example of embodiment may be subject to variations without departing from the protection scope of the present invention, comprising all equivalent designs known to a man skilled in the art.

The elements and features shown in the various preferred embodiments may be combined together without however departing from the protection scope of the present invention.

The advantages deriving from the application of the present invention are apparent, as described below by way of example.

Soft switching from one clip to the next is obtained.

In prior-art systems, in order to obtain different types of clip evolution, different clips are created, among which the user makes a selection. According to the present invention, on the contrary, the evolution of the clip itself is modified.

In prior-art systems, overlays or hyperlinks are added to obtain interactions, which however distract from pure fruition of the video clip (the term "pure" referring herein to viewing the video clip with no additional elements). According to the present invention, on the contrary, the video clip is directly acted upon without requiring the use of any additional elements on the video clip.

From the above description, those skilled in the art will be able to produce the object of the invention without introducing any further construction details.

The invention claimed is:

1. A method for creation of interactive audio-video contents, through visualization on an interactive display, comprising:
   providing at least one set of interconnected video segments that are adapted to evolve in time and include an initial video segment (START) and one or more final video segments (END1, . . . ENDn), each video segment including a non-interactive video clip having a given, or even null, duration, and an interactive node, said interactive node acting as an interconnection with one or more other video segments, each interactive node including a loop interval (TLi, TLf) subject to continuous cyclical forward and backward time evolution,
   providing at least one set of commands adapted to determine connection choices among said video segments, wherein said commands can be activated during at least one of said loop intervals,
   in at least one of said loop intervals, making association between said commands and video segments of said one or more other video segments, and
   upon activation of a command during said loop interval, exiting said interval and continuing in that video segment of said one or more other video segments in which said interactive audio-video content continues, depending on the command chosen from said set of commands, starting from said initial video segment (START) and ending in one of said final video segments (END1, . . . ENDn), so as to create an interactive audio-video content on said interactive display as a sequence of said video segments, wherein:
   said interactive node includes a node sequence of video content including said loop interval and further forward and backward time continuation intervals around said loop interval, time markers being set:
     in said loop interval as start instants (TLi) and end instants (TLf) of the continuous cyclical forward and backward time evolution;
     in said further forward time continuation intervals (Tf1 . . . Tfn); and
     in said further backward time continuation intervals (Tb1 . . . Tbn);
   each time marker in said further forward and backward continuation intervals corresponds to the instant when the interactive audio-video content continues in one of said one or more other video segments, the start instant of which is associated with one of said time markers.

2. The method according to claim 1, wherein a command coming at different time instants within a loop interval determines the exit from the node sequence in different ways towards different further video segments.

3. The method according to claim 2, wherein:
   more than one set of interconnected video segments are provided, and
   said commands can determine the evolution of said interactive audio-video content in any one of said sets of interconnected video segments or, in parallel, in each one of said sets of interconnected video segments.

4. The method according to claim 1, wherein said node sequence evolves at an increased or decreased frame-rate, if the loop interval has a frame-rate that is higher than a standard frame-rate.

5. The method according to claim 4, wherein:
   more than one set of interconnected video segments are provided, and
   said commands can determine the evolution of said interactive audio-video content in any one of said sets of interconnected video segments or, in parallel, in each one of said sets of interconnected video segments.

6. The method according to claim 1, wherein:
more than one set of interconnected video segments are provided, and
said commands can determine the evolution of said interactive audio-video content in any one of said sets of interconnected video segments or, in parallel, in each one of said sets of interconnected video segments.

7. The method according to claim 1, wherein, if no command is received within a maximum time of evolution of said loop interval, an automatic evolution towards another video segment or an end of said creation of an interactive audio-video content will be determined.

8. The method according to claim 1, wherein said commands are derived from corresponding commands available on a user terminal, which can be activated by:
a plurality of sensors of the terminal;
a plurality of gestures of the terminal;
software commands in the terminal; or
any combination of the above.

9. The method according to claim 1, wherein:
more than one set of interconnected video segments are provided, and
said commands can determine the evolution of said interactive audio-video content in any one of said sets of interconnected video segments or, in parallel, in each one of said sets of interconnected video segments.

10. The method according to claim 1, wherein, if no command is received within a maximum time of evolution of said loop interval, an automatic evolution towards another video segment or an end of said creation of an interactive audio-video content will be determined.

11. The method according to claim 1, wherein said commands are derived from corresponding commands available on a user terminal, which can be activated by:
a plurality of sensors of the terminal;
a plurality of gestures of the terminal;
software commands in the terminal; or
any combination of the above.

12. A system for creation of interactive audio-video contents, through visualization on an interactive display, comprising means for implementing the method according to claim 1.

13. The system according to claim 12, wherein a command coming at different time instants within a loop interval determines the exit from the node sequence in different ways towards different further video segments.

14. A user terminal for creation of interactive audio-video contents, comprising:
means for implementing the method according to claim 1, and:
an interactive display and/or one or more sensors, from which at least some of said commands can be derived, and/or one or more motion detectors, from which at least some of said commands can be derived.

15. The user terminal according to claim 14, wherein a command coming at different time instants within a loop interval determines the exit from the node sequence in different ways towards different further video segments.

* * * * *